April 6, 1965 P. L. MORSE Re. 25,757
INSULATING AND CORROSION PROTECTIVE MATERIAL
AND METHOD OF APPLICATION
Original Filed July 11, 1956
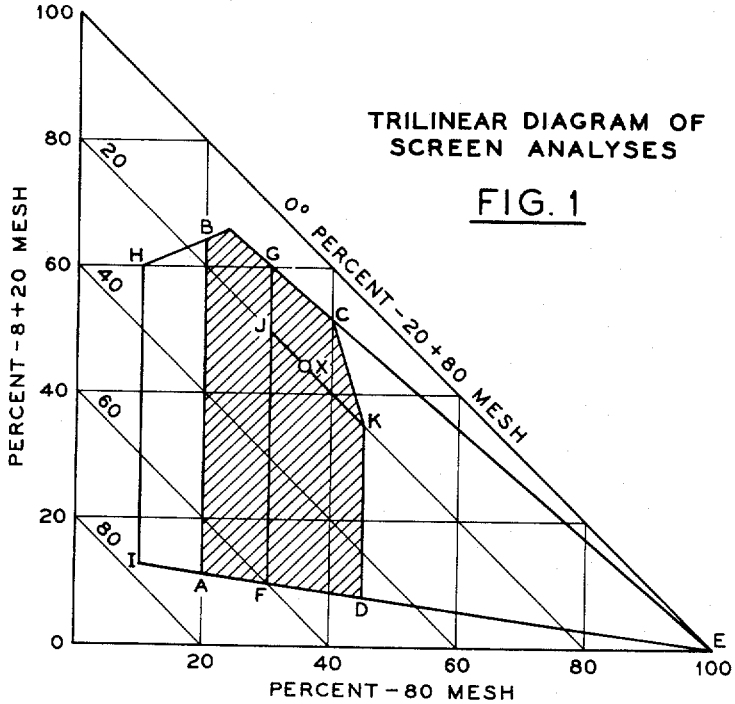
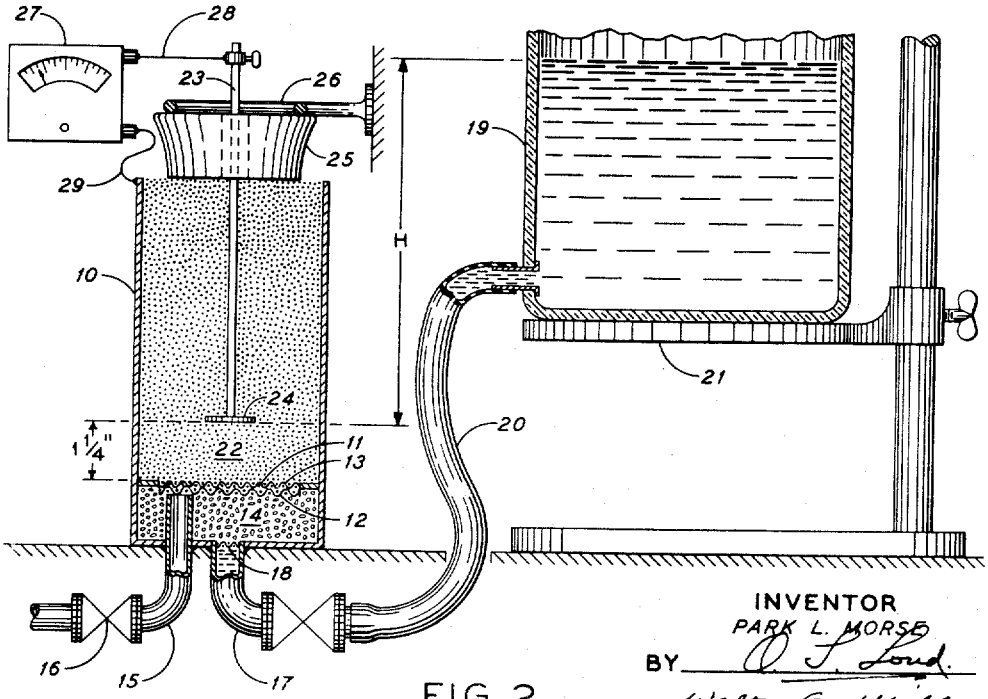
FIG. 2
INVENTOR
PARK L. MORSE
BY O. F. Loud.
Walter G. Miller
ATTORNEYS United States Patent Office Re. 25,757
Reissued Apr. 6, 1965

25,757

INSULATING AND CORROSION PROTECTIVE MATERIAL *AND METHOD OF APPLICATION*

Park L. Morse, Moraga, Calif., assignor to American Gilsonite Company, Salt Lake City, Utah, a corporation of Delaware Original No. 2,903,409, dated Sept. 8, 1959, Ser. No. 597,208, July 11, 1956. Application for reissue June 19, 1963, Ser. No. 289,790
27 Claims. (Cl. 264—35)

Matter enclosed in heavy brackets [ ] appears in the original patent but forms no part of this reissue specification; matter printed in italics indicates the additions made by reissue.

This invention relates to granulated insulation of the type covering metallic and other structures that are to be buried in the earth, to prevent corrosion of such structures and also to retard the flow of heat to or from the structure, and particularly refers to natural asphaltites, asphaltic pyrobitumens, oxidized asphalts, steam refined asphalts, hard natural asphalts, and specifically granulated gilsonite having certain physical, structural, and water-repellant or hydrophobic characteristics that will be pointed out in detail below.

This is an improvement over the materials and the procedures for their use described in U.S. Patent No. 2,668,125, issued February 2, 1954, to J. H. Baker et al. The materials of that patent included powdered gilsonite among a group of natural asphalites. The gilsonite was ground so that 50 to 80 percent would pass a 10-mesh screen, and included larger pieces up to 1 inch in maximum dimension, as well as an unspecified proportion of the nature of an impalpable powder or dust. A layer of 2 inches or more was poured around the pipe to be protected, and, after backfilling, the pipe was heated for a period of 10 to 50 hours and at a temperature of 235° to about 500° F., sufficient to completely consolidate the gilsonite at the pipe surface and for a short distance outwardly, the melted zone merging into a sintered zone and then to discrete particles.

This invention comprehends broadly hitherto unused ranges and proportions of sizes of granulated bituminous materials to develop the full advantages of the hydrophobic nature of those materials to an extent that renders unnecessary the heating step of the Baker patent referred to above. Numerous applications of the improvement are thus possible where heating would not be feasible or desirable.

There are a number of factors that are involved in the practice of this invention, one of the most important being the proportions of particles of specific size ranges, which affects not only the water retardency of the final insulation, but also its load-bearing characteristics and even, to some extent, the behavior of the material during shipment. To demonstrate its utility and to provide a means for quickly predicting and checking the efficiency of a given lot of material, a water retardency test procedure and test equipment have been developed and will be illustrated and described herein.

Another important factor in the practice of this invention is the selection of a bituminous material having a sintering temperature that is not substantially lower than the highest temperature that will be attained by the body or structure being protected. Gilsonites having sintering temperatures between 150° and 250° F. and even higher may be obtained. Grahamites and wurtzilites may be found to have sintering temperatures up to 500° F. and higher. Oxidized and steam refined asphalts having comparable properties are prepared by well-known procedures known in the oil refining art. Natural asphalts and highly distilled asphalts are also available. Sintering temperatures may be determined by heating a quantity of the granulated bituminous material under controlled conditions and noting the temperature at which adjacent discrete particles adhere. If the sintering temperature is exceeded for a sufficient distance outward from the hot object being protected, the mobility of the insulation layer is lost and its ability to accept movement or settling without creating voids or fissures is impaired.

It is an object of this invention to provide an improved granulated bituminous insulating material which will be effective to protect structures, for example, buried pipelines carrying relatively cool fluids (at soil temperatures or higher), from corrosion by soil water or electrolytes at moderate hydrostatic heads such as are generally encountered in field practice.

Another object is to provide an insulation which requires no preliminary application of heat prior to its use and which will retain mobility, flexibility or fluidity over extended periods to accept without damage movements of the structure it encloses as well as soil movement.

Another object is to provide an insulation which may be adapted for different conditions of use, e.g., where high load-carrying properties are desirable, without materially detracting from its water repellancy.

Another object is to provide an insulation that will be effective in reducing heat flow and also will give substantial protection against flow of electrolytic or soil current, for example, for footings or structural foundations in geographical areas when permafrost is encountered. Such a material will also be effective in protecting buried materials of construction in areas possessing corrosive soil.

Another object is to produce an insulation and corosion protective material comprising substantially unsintered, discrete, hydrophobic bitmuinous particles. An insulation requiring no consolidation will usually be thinner and, hence, will require much less material than one having an equal heat loss rate and possessing some consolidated particles.

Another object is to provide a material which may be readily and simply prepared by grinding and size-classifying or screening equipment to meet the particle size distributions that are essential or desirable for its successful use.

These and other objects and advantages will be further apparent from the following description of several examples of formulations embodying the invention, taken in connection with the accompanying drawing, which forms a part of this specification.

In the drawing.

FIGURE 1 is a trilinear diagram showing ranges of the screen analyses effective for the practice of the invention.

FIGURE 2 is a diagrammatic and part sectional view of an example of a simple form of testing apparatus by which the water retardency of a given particle size mixture or batch of the material may be determined in a short time. The equipment may also be used for long-time tests, if so desired.

Referring first to FIGURE 1, it will be noted that the three scales of this trilinear diagram represent percentages of particles of bitumen within specific size ranges. The vertical scale represents the fraction having the largest dimensions, —8+20 mesh, which refers to the ASTM specification E–11–39 Tyler sieves (nominally called screens), and signifies the percentage of that material which passes through an 8-mesh screen and is retained on a 20-mesh screen. The diagonal scale represents the fraction passing through a 20-mesh and retained on an 80-mesh Tyler screen. The horizontal scale represents the percentage of material finer than 80 mesh.

Although Tyler screen sizes in the fine series have openings as small as 37 microns (No. 400), it has been found that use of screens smaller than about 80 mesh (about 180 microns) for pulverized bituminous materials gives erratic and oftentimes false readings due to screening difficulties during the shaking operation. Accordingly, in determining the proportions of sizes smaller than about 80 mesh, it has been found convenient to disperse that fraction in fresh water, desirably with a surface-active agent, to overcome its hydrophobic properties, and to count the number of particles of desired sizes with a comparison microscope.

For example, point X designates a three-component system which is composed of 45 percent −8+20 mesh, 20 percent −20+80 mesh and 35 percent −80 mesh bitumen particles. The distribution and sizing range of the −80 mesh will be discussed in more detail below.

The data plotted on the diagram of FIGURE 1 include the results of numerous tests of water retardency and what may be termed packability. It will be noted that there are two general areas designated in FIGURE 1, that area within ABCKDA representing high water retardency and reasonably good packability, and that area outside of ABCKDA representing low or moderate water retardency and/or low packability. In general, IHBEI represents desirable ranges of screen analyses of bituminous particles suitable for practicing this invention, and the remaining area represents unsuitable or undesirable sizes of bitumen particles. However, it will be shown subsequently that portions of area IHBEI may have accompanying restrictions imposed. The area enclosed by ABCKDA includes the preferred ranges of particle sizes and proportions for materials having high water retardency and reasonably good packability. It has been found that, as a composition departs from the line CKD toward point E, the mechanical load-bearing characteristics and packability are less desirable, even though water retardency may be improved, so that mixtures in the area CKDEC will usually require a supplemental mechanical covering over the bitumen layer to make up for somewhat lower load-bearing characteristics.

As will be noted from the examples at the end of this specification, the region in area BEAB and to the right of the line FG designates mixtures of particle sizes that are particularly benefited in regard to water retardency by having a large proportion of the −80 mesh particles in the −18 micron range.

Area HBAIH of FIGURE 1 has excellent load-bearing and packing characteristics and moderately good water retardency. Accordingly, this range of particle sizes proves excellent for insulating and protecting construction materials against corrosion when soil water heads are modest, say about 12 inches or more. In this area and in the range of about 20–30% of −8+20 mesh, accelerated water retardency up to 15–23 inches is obtainable.

The area immediately surrounding line J—K of FIGURE 1 in the area GCKDFG particle size ranges having optimum water retardency, up to approximately 30–60 inches, and reasonably good packability.

In general, it has been found that granulated bituminous mixes according to this invention will assume a degree of compaction of over 0.65 when they are poured into place to insure that there will be no voids beside or beneath the body being protected. The term "degree of compaction" as used herein may be defined as the bulk density divided by the true density of a bituminous particle. Excessive tamping may increase the degree of compaction, approaching a maximum of 1.0, which means all voids have been filled. This is undesirable due to lack of fluidity or mobility of the insulation layer which enables it to accept without cracking a certain degree of motion of the structure being insulated, soil movements, and the like. The thickness of the granulated layer may vary according to the insulating properties desired, and generally ranges from a minimum of about 2 inches to 6 inches or more.

The expression "packability" used above refers to the ability of the granulated material to lose its fluffy or flow characteristics upon being vibrated, tamped, or knifed into place. For example, if −80 mesh bitumen particles are poured in a ditch containing a pipe line, the fine material will tend to flow outwardly much as water would. It will prove almost impossible to tamp because of its fluffy character. Accordingly, such finely divided material will not generally be desirable to support surface loads and will prove difficult to place in a ditch.

The property of packability as used herein, and which is an indication of load-bearing ability, may be determined by means of a penetrometer such as is used for consistency of lubricating greases (ASTM D 217–52T; American Standards Association ASA No. Z 11.3–1952), and desirably modified to provide a solid metal cone having an included angle of 45° and a total weight, including movable attachments of 400±0.05 grams. This may be fabricated of brass rod 1.375 inch in diameter having a cylindrical section about 0.37 inch long, the conical portion being 1.60 inch long. The axial guide shaft opposite the point of the cone is 0.125 inch diameter and 2 inches long. Desirably, the outer surface is protected against abrasion by electroplating and polishing.

The procedure for determining the penetration or packability is carried out at atmospheric temperature (65–85° F.) on a sample of the graulated mixture retained in suitable container about 3 inches in diameter and 4 inches high. After adequate mixing or blending, enough of the granulated bituminous mixture is poured into the container to fill it completely, with a minimum of agitation. While the filled container rests upon a hard, flat, level surface, it is rotated slowly and tapped around its periphery, for example, by the handle of a conventional wooden handled laboratory spatula about 15 inches long. Desirably, the spatula is grasped by the hand at the outer end of the blade, and it is uniformly and firmly tapped about 30 times against the container wall to give a uniform degree of settling, the force of tapping being supplied solely by flicking the index finger.

The filled container is placed in the penetrometer and the cone is lowered until the point just touches the surface of the sample, after which the release clutch is operated and the cone permitted to penerate the sample mixture under its unsupported weight. This will require only a few seconds, after which the penetration depth indicator shaft is depressed in the usual manner to touch the upper end of the cone shaft, and the dial indicator, calibrated in tenths of millimeters, is read. Desirably, six successive readings are taken following the procedure just outlined, the sample being removed from its holder and remixed thoroughly between each test. The two readings deviating the greatest from the average should generally be ignored and the average of the four remaining readings utilized.

Mixtures according to this invention having penetrations below about 250–260 pack reasonably well and are capable of taking appreciable surface loads. Mixtures having penetrations above about 275–290 tend to be fluffy, are difficult to pack around the structure to be insulated and protected, and will generally tend to be deficient in load-carrying properties, unless auxiliary coverings, such as a sheet of fibrous or metallic material, are used as load-distributors or load-carriers.

Penetration or packability results for some granulated bitumen made from ground and sized gilsonite from the Eureka, Utah location are given in Table I.

TABLE I

| Blend | Sizing, Weight Percent | | | Penetration |
|---|---|---|---|---|
| | −8+20 Mesh | −20+80 Mesh | −80 Mesh | |
| 1 | 50.0 | 20.0 | 30.0 | 233 |
| 2 | 44.5 | 20.1 | 35.4 | 228 |
| 3 | 42.1 | 17.8 | 40.1 | 252 |
| 4 | 37.8 | 16.9 | 45.2 | 286 |
| 5 | 36.0 | 14.0 | 50.0 | 345 |

Referring now to FIGURE 2, which illustrates a form of apparatus for testing of the water retardency for the particle size ranges of this invention, reference numeral 10 designates an open topped metal container, which, in this example, may be about 4 inches in diameter and 9 inches high. About one inch from the bottom is placed a removable metal screen 11, desirable formed from a lower disc 12 of 10-mesh screen on top of which is secured a disc 13 of 40-mesh screen. Below screen 11 is placed a quantity of —8 mesh gravel to form a readily water-permeable bed 14. An air vent tube 15 leads through the wall of container 10 and terminates at the bottom of screen 12. Valve 16 is provided to close vent tube 15 when bed 14 has been filled with water to the level of screen 11.

A water inlet 17 in the bottom of container 10 is covered with a suitable metal screen 18 to prevent loss of gravel from bed 14 and communicates with a water-filled bottle 19 by means of a valved flexible tube 20. A ring stand 21 or other vertically adjustable means is adapted to support bottle 19 so that the surface of the water therein is at a desired height "H" above the level of screen 11.

To prepare the equipment of FIGURE 2 of this example for a test of the water retardency of a given mixture of bituminous particles 22, a quantity of these particles adequate to fill container 10 is placed therein at a desired degree of compaction, which may be attained by previously calibrating the volume of the container to a depth of 1¼ inches above screen 11, placing a weighed amount of bituminous material in the container and vibrating it to the 1¼ inch level, then leveling the surface through the light action of a cylindrical tamper. A metal rod 23 terminating in a metal disc 24 is centered in container 10, with the disc resting on the previously compacted bitumen layer. Thereafter, several successive amounts of the same mixture of bitumen particles 22 are added to fill container 10 to a point somewhat below the top, each layer being added so as to provide essentially the same bulk density as the previous layer. Tapping of the cylinder wall provides a means for accomplishing this.

A rubber stopper 25 is placed over the rod and on the particles 22 and held in place by clamp 26. Finally, an electrical resistance measuring device, such as ohmmeter 27, is connected by wires 28 and 29 between container 10 and control rod 23. Normally the electrical resistance of the system just described will be very high, on the order of 200 to 1000 megohms.

To impose the accelerated test on the bitumen particle mixture 22 in container 10, water is admitted from bottle 19 through tube 20 to bed 14 below screen 11. After air has been vented from bed 14 through the vent tube 15, as evidenced by water flowing out of valve 16, that valve is closed and the bottle 19 is positioned to impose a hydrostatic head H of one inch upon the bitumen layer below disc 24 for a period of five minutes, after which it is raised a specific distance, for example, one inch for each of successive five minute intervals. Meanwhile, the condition of electrical resistance between screen 11 and disc 24 is noted by observing the indication of ohmmeter 27. When sufficient hydrostatic head has been imposed to force water through the 1¼ inch layer of bitumen particles 22, as evidenced by the resistance suddenly dropping to a lower value, for example, below 10 megohms, the hydrostatic head required is noted, and the test is completed.

A permanent or long-time head test may be conducted in the same manner described above except after reaching a given height, "H," dependent upon conditions of use, the head is not again altered. In general, accelerated and permanent tests are run on materials containing 35% —80 mesh or less. Permanent tests alone are run on materials having a —80 mesh content above about 35%. This arises from the fact that when the percent of —80 mesh becomes higher, the discrepancy between accelerated and permanent head results becomes greater and, accordingly, the accelerated test loses some of its significance.

Examples of the practice of this invention representative of the granulated hydrophobic bituminous materials enumerated are given below.

EXAMPLE I

| | Percent |
|---|---|
| —8+20 mesh | 11 to 60 |
| —80 mesh | 20 to 30 |
| the —80 mesh material containing particles down to and including —18 microns. | |
| —20+80 mesh | Remainder |

EXAMPLE II

| | Percent |
|---|---|
| —8+20 mesh | 11 to 55 |
| —80 mesh | 20 to 35 |
| the —80 mesh fraction consisting of material down to and including the —18 micron size which comprises a minimum of 90% by number [1] of the —80 mesh fraction. | |
| —20+80 mesh | Remainder |

[1] Percent by number is obtained by counting the number of particles with the aid of a microscope.

EXAMPLE III

| | Percent |
|---|---|
| —8+20 mesh | 8 to 35 |
| —80 mesh | 35 to 45 |
| the —80 mesh fraction consisting of material down to and including the —18 micron size which comprises a minimum of 90% by number of the —80 mesh fraction. | |
| —20+80 mesh | Remainder |

EXAMPLE IV

| | Percent |
|---|---|
| —8+20 mesh | 8 to 30 |
| the —8+10 mesh fraction comprising between 0 and 80% of the —8+20 mesh fraction. | |
| —80 mesh | 25 to 65 |
| the —80 mesh fraction consisting of material down to and including the —18 micron size which comprises a minimum of 90% by number of the —80 mesh fraction. | |
| —20+80 mesh | Remainder |

EXAMPLE V

| | Percent |
|---|---|
| —8+20 mesh | 8 to 35 |
| —80 mesh | 25 to 45 |
| the —80 mesh fraction consisting of material down to and including the —18 micron size which comprises a minimum of 90% by number of the —80 mesh fraction. | |
| —20+80 mesh | Remainder |

EXAMPLE VI

To be used around pipe with a device such as a conduit or concrete slab to protect against surface loads, or to be used on pipe buried deep in compacted soil.

| | Percent |
|---|---|
| —20+80 mesh | 10 to 40 |
| —80 mesh | 45 to 90 |
| the —80 mesh fraction consisting of material down to and including the —18 micron size which comprises a minimum of 90% by number of the —80 mesh fraction. | |
| —8+20 mesh | Remainder |

EXAMPLE VII

Following is an example of a specific formulation of gilsonite mined at Eureka, Utah, illustrating the teaching of this specification:

| Size: | Percent by weight |
|---|---|
| —8+10 mesh | 14.2 |
| —10+20 mesh | 30.4 |
| —20+80 mesh | 20.1 |
| —80 mesh | 35.3 |

| Size: | Percent by number in −80 mesh fraction |
|---|---|
| +180 microns | 0 |
| −180+90 microns | 0.6 |
| −90+45 microns | 1.1 |
| −45+18 microns | 5.2 |
| −18 microns | 93.1 |

| | |
|---|---|
| Bulk density | 51.2 lb./ft.³. |
| Degree of compaction | 0.79. |
| Retardation of hydrostatic head (accelerated) | 50 to 55 in. of water. |
| Thermal conductivity | 0.06 B.t.u.×ft./hr.×ft.²×° F. |
| Cone penetration | 220. |

In conclusion, it will be understood that this invention is directed to an improved insulation consisting of discrete hydrophobic particles of bituminous material chosen from the groups enumerated above, and which has been granulated, classified and blended to give specific proportions of particles in certain size ranges. It has been shown that these ranges are material to the success of the invention. Accordingly, all such sizes and proportions that come within the scope of the appended claims are intended to be embraced thereby.

I claim:

[1. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area IHBEI of the trilinear diagram of FIGURE 1.]

[2. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area ABEA of the trilinear diagram of FIGURE 1.]

3. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area ABCKDA of the trilinear diagram of FIGURE 1.

4. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area GCKDFG of the trilinear diagram of FIGURE 1.

5. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area AIHBA of the trilinear diagram of FIGURE 1.

6. An insulating body of granular material according to claim 3, which will have an accelerated water retardency of at least 15 inches when imposed at the rate of one inch in 5 minutes.

7. An insulating body of granular material according to claim 4, which will have an accelerated water retardency between about 15 and 60 inches when imposed at the rate of one inch in 5 minutes.

8. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the values of the following table, expressed in percent by weight:

| | Percent |
|---|---|
| −8+20 mesh | 10 to 60 |
| −80 mesh | About 30 |
| −20+80 mesh | 10 to 60 |

in which the −80 mesh fraction includes particles down to and including 20 microns, and which will have an accelerated water retardency greater than about 24 inches when imposed at the rate of one inch in 5 minutes.

*9. An insulating body of granular material according to claim 3, wherein said material is gilsonite and wherein said body has a penetration below about 275.*

*10. An insulating body of granular material according to claim 4, wherein said material is gilsonite and wherein said body has a penetration between about 180 and 265.*

*11. An insulating body of granular material according to claim 9, which will have an accelerated water retardency of at least 15 inches when imposed at the rate of one inch in 5 minutes.*

*12. An insulating body of granular material according to claim 10, which will have an accelerated water retardency between about 15 and 60 inches when imposed at the rate of one inch in 5 minutes.*

*13. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the values of the following table, expressed in percent by weight:*

| | *Percent* |
|---|---|
| *−8+20 mesh* | *About 42 to 50* |
| *−80 mesh* | *About 30 to 40* |
| *−20+80 mesh* | *Remainder* |

*14. An insulating body of granular material according to claim 13, wherein said material is gilsonite and wherein said body has a penetration below about 275.*

*15. An insulating body of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area immediately surrounding the line J—K of the trilinear diagram of FIGURE 1.*

*16. An insulating body of granular material according to claim 15, wherein said material is gilsonite and wherein said body has a penetration below about 275.*

*17. An insulating body of discrete mobile particles of granular gilsonite for protecting underground piping from corrosion without such an application of heat to the particles as would form a sintered or consolidated zone, said gilsonite having a sintering temperature above the maximum temperature attained by said piping, said particles having a screen analysis substantially corresponding to the point "X" of the trilinear diagram of FIGURE 1.*

*18. An insulating body in the form of a layer, at least two inches thick, of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area ABCKDA of the trilinear diagram of FIGURE 1.*

*19. An insulating body of granular material according to claim 18, wherein said material is gilsonite and wherein said body has a penetration below about 275.*

*20. An insulating body in the form of a layer, at least two inches thick, of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area GCKDFG of the trilinear diagram of FIGURE 1.*

*21. An insulating body in the form of a layer, at least two inches thick, of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area AIHBA of the trilinear diagram of FIGURE 1.*

*22. An insulating body in the form of a layer, at least two inches thick, of discrete mobile particles of granular material for protecting underground piping from corrosion without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the values of the following table, expressed in percent by weights*

| | Percent |
|---|---|
| —8+20 mesh | About 42 to 50 |
| —80 mesh | About 30 to 40 |
| —20+80 mesh | Remainder |

*23. An insulating body in the form of a layer, at least two inches thick, of discrete mobile particles of granular gilsonite for protecting underground piping from corrosion without such an application of heat to the particles as would form a sintered or consolidated zone, said gilsonite having a sintering temperature above the maximum temperature attained by said piping, said particles having having a screen analysis substantially corresponding to the point "X" of the trilinear diagram of FIGURE 1.*

*24. A method of insulating and protecting underground piping from corrosion comprising covering a surface of said piping with a layer at least two inches thick of an insulating body of discrete mobile particles of granular material without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area ABCKDA of the trilinear diagram of FIGURE 1.*

*25. A method according to claim 24, wherein said material is gilsonite and wherein said body has a penetration below about 275.*

*26. A method of insulating and protecting underground piping from corrosion comprising covering the surface of said piping with a layer at least two inches thick of an insulating body of discrete mobile particles of granular material without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area GCKDFG of the trilinear diagram of FIGURE 1.*

*27. A method of insulating and protecting underground piping from corrosion comprising covering the surface of said piping with a layer at least two inches thick of an insulating body of discrete mobile particles of granular material without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the area AIHBA of the trilinear diagram of FIGURE 1.*

*28. A method of insulating and protecting underground piping from corrosion comprising covering the surface of said piping with a layer at least two inches thick of an insulating body of discrete mobile particles of granular material without such an application of heat to the particles as would form a sintered or consolidated zone, said material being chosen from the group consisting of natural asphaltites, asphaltic pyrobitumens and gilsonite having a sintering temperature above the maximum temperature attained by said piping, said particles having a screen analysis substantially within the values of the following table, expressed in percent by weight:*

| | Percent |
|---|---|
| —8+20 mesh | About 42 to 50 |
| —80 mesh | About 30 to 40 |
| —20+80 mesh | Remainder |

*29. A method of insulating and protecting underground piping from corrosion comprising covering a surface of said piping with a layer at least two inches thick of an insulating body of discrete mobile particles of granular gilsonite without such an application of heat to the particles as would form a sintered or consolidated zone, said gilsonite having a sintering temperature above the maximum temperature attained by said piping, said particles having a screen analysis substantially corresponding to the point "X" of the trilinear diagram of FIGURE 1.*

References Cited by the Examiner

The following references, cited by the Examiner, are of record in the patented file of this patent or the original patent.

UNITED STATES PATENTS

| | | | |
|---|---|---|---|
| 2,265,801 | 12/41 | Cooke | 264—11 |
| 2,396,910 | 3/46 | Zaisser | 208—23 |
| 2,668,125 | 2/54 | Baker et al. | 117—18 |
| 2,773,670 | 12/56 | Miller | 252—8.5 |
| 2,812,161 | 11/57 | Mayhew | 252—8.5 |
| 2,870,080 | 1/59 | Illman et al. | 208—23 |

ALPHONSO D. SULLIVAN, *Primary Examiner.*